(12) United States Patent
Jones et al.

(10) Patent No.: US 7,949,704 B2
(45) Date of Patent: May 24, 2011

(54) ADMINISTRATION OF A BROKER-BASED PUBLISH/SUBSCRIBE MESSAGING SYSTEM

(75) Inventors: David Richard Jones, Pickering (GB); Andrew James Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 11/295,922

(22) Filed: Dec. 7, 2005

(65) Prior Publication Data

US 2006/0167897 A1    Jul. 27, 2006

(30) Foreign Application Priority Data

Dec. 8, 2004 (GB) .................................. 0426846.2

(51) Int. Cl.
    *G06F 15/16*      (2006.01)
(52) U.S. Cl. ........................................................ 709/201
(58) Field of Classification Search ............... 707/10, 707/102, E17.005, 1, 6, E17.032, 100, 3, 707/E17.109, 104.1; 709/201, 206, 230, 709/231, 202, 224, 246, 223, 207, 238, 225, 709/244; 719/318, 313, 328; 705/37; 706/62
See application file for complete search history.

(56) References Cited

U.S. PATENT DOCUMENTS

| | | | |
|---|---|---|---|
| 6,173,173 B1 * | 1/2001 | Dean et al. .................... 455/410 |
| 6,182,143 B1 * | 1/2001 | Hastings et al. ............... 709/231 |
| 6,202,093 B1 * | 3/2001 | Bolam et al. .................. 709/225 |
| 7,103,680 B1 * | 9/2006 | Holdsworth et al. ......... 709/246 |
| 7,388,839 B2 * | 6/2008 | Chafle et al. .................. 370/236 |
| 7,406,537 B2 * | 7/2008 | Cullen .......................... 709/238 |
| 7,706,895 B2 * | 4/2010 | Callaghan ....................... 700/17 |
| 2002/0069157 A1 * | 6/2002 | Jordan ............................ 705/37 |
| 2003/0046589 A1 * | 3/2003 | Gregg ........................... 713/201 |
| 2003/0084112 A1 * | 5/2003 | Curray et al. ................. 709/208 |
| 2003/0115317 A1 * | 6/2003 | Hickson et al. .............. 709/224 |
| 2004/0049573 A1 | 3/2004 | Olmstead et al. ............ 709/224 |
| 2005/0010388 A1 * | 1/2005 | Bagchi et al. ................... 703/22 |
| 2005/0097041 A1 * | 5/2005 | Campbell et al. .............. 705/40 |
| 2008/0066168 A1 * | 3/2008 | Gregg et al. ..................... 726/7 |
| 2008/0168122 A1 * | 7/2008 | Fletcher et al. ............... 709/201 |

FOREIGN PATENT DOCUMENTS

EP      0961452      12/1999

* cited by examiner

*Primary Examiner* — Jeffrey Pwu
*Assistant Examiner* — Saad A Waqas
(74) *Attorney, Agent, or Firm* — Steven L. Nichols; VanCott, Bagley, Cornwall & McCarthy P.c.

(57) ABSTRACT

A broker-based publish/subscribe messaging system is administered in which a session-based network connection (such as TCP/IP) from an administrator publish/subscribe client application is established with a broker. Administration commands are received as messages from the administrator publish/subscribe client application at the broker via the session-based network connection and response messages are sent from the broker via the session-based network connection to only the administrator publish/subscribe client application.

14 Claims, 3 Drawing Sheets

ADMINISTRATION OF A BROKER-BASED PUBLISH/SUBSCRIBE MESSAGING SYSTEM

BACKGROUND OF THE INVENTION

This invention relates to the field of administration of a broker-based publish/subscribe messaging system.

Publish/subscribe data processing systems enable data messages to be distributed from publishing computer applications (also referred to as publishers) to subscribing computer applications (also referred to as subscribers). The publishing and subscribing applications can be widely distributed client applications connected using network communications.

In publish/subscribe models a publisher application can send a message to multiple subscriber applications via a messaging system. Subscribers register an interest with a messaging system in receiving messages from one or more publishers or relating to a particular message topic or content. The publisher creates a message and publishes it to the messaging system which then delivers it to the subscribers.

The publish/subscribe arrangement is suitable in situations where a single message is required by and distributed to multiple client applications. The publication operation is kept separate from the subscriptions and the publisher does not need to know anything about the type or number of subscribers.

The messaging system is the intermediary acting between the publishers and subscribers. Messaging system middleware matches publications to subscribers and handles the delivery of the messages. Messaging middleware can use various architectures including a message broker or network of message brokers. Communication is via any form of communication media including wireless networks, the Internet, etc.

In a message broker architecture, the client applications in the form of publisher and/or subscriber applications are connected to a message broker which handles the communication between the client applications. The message broker coordinates the distribution of messages. It provides the routing of the messages, it is responsible for the delivery of messages and the authentication and authorisation of users. This form of architecture allows a publisher client application to send a message to multiple subscriber client applications while only requiring a connection to the message broker. Also, the client applications require minimal messaging software as most of the messaging processing is carried out on the messaging broker.

Administration of a publish/subscribe message broker, running on a remote system, is typically done using some sort of graphical user interface (GUI) or command-line tools which send special messages into the broker through some form of administration connection. In other situations, the administrator can log on to the remote system (for example, using telnet or ssh (secure shell)) and then use local command-line tools to reconfigure the broker. In this way, along side publish/subscribe protocol users, an administrator connects over a different sort of connection and carries out the administration.

A more natural approach to remote administration of a publish/subscribe message broker is to use publish/subscribe messaging for remote administration. This requires a client application which can publish messages on a topic and can display messages received on a topic to which the client application has subscribed.

The procedure would be that commands are published on a pre-defined administration topic and the administrator client application subscribes to a response topic to see the result of the command. So, in effect, the administrator client application has an interactive dialogue with the broker using a pair of publish/subscribe topics. An application could also make use of this same mechanism to give a GUI-based administration environment using the publish/subscribe infrastructure for communication.

BRIEF SUMMARY OF THE INVENTION

According to a first aspect of the present invention, a method for administration of a broker-based publish/subscribe messaging system comprises establishing a session-based network connection from a publish/subscribe client application to a broker, receiving administration commands as messages from the publish/subscribe client application to the broker via the session-based network connection and sending response messages from the broker via the session-based network connection to only the administering publish/subscribe client application.

According to another aspect of the present invention, a system for administration of a broker-based publish/subscribe messaging system comprises at least one publish/subscribe client application which publishes messages, at least one publish/subscribe client application which subscribes to messages, a message broker providing message handling for the publish/subscribe client applications, and an administrator publish/subscribe client application with a session-based network connection to the broker. The administrator publish/subscribe client application is configured to receive administration commands as messages from the administrator client publish/subscribe application to the broker via the session-based network connection and to send response messages from the broker via the session-based network connection to only the administrator publish/subscribe client application.

According to yet another aspect of the present invention, a computer program product for administration of a broker-based publish/subscribe messaging system comprises a computer usable medium having computer useable program code embodied therewith. The computer useable program code comprises computer usable program code configured to establish a session-based network connection from a client publish/subscribe application to a broker, computer usable program code configured to receive administration commands as messages from the client application to the broker via the session-based network connection and computer usable program code configured to send response messages from the broker via the session-based network connection to only the administering publish/subscribe client application.

Other aspects and features of the present invention will become apparent to those ordinarily skilled in the art or science to which it pertains upon review of the following description in conjunction with the accompanying figures.

DETAILED DESCRIPTION OF THE INVENTION

Figure 1:
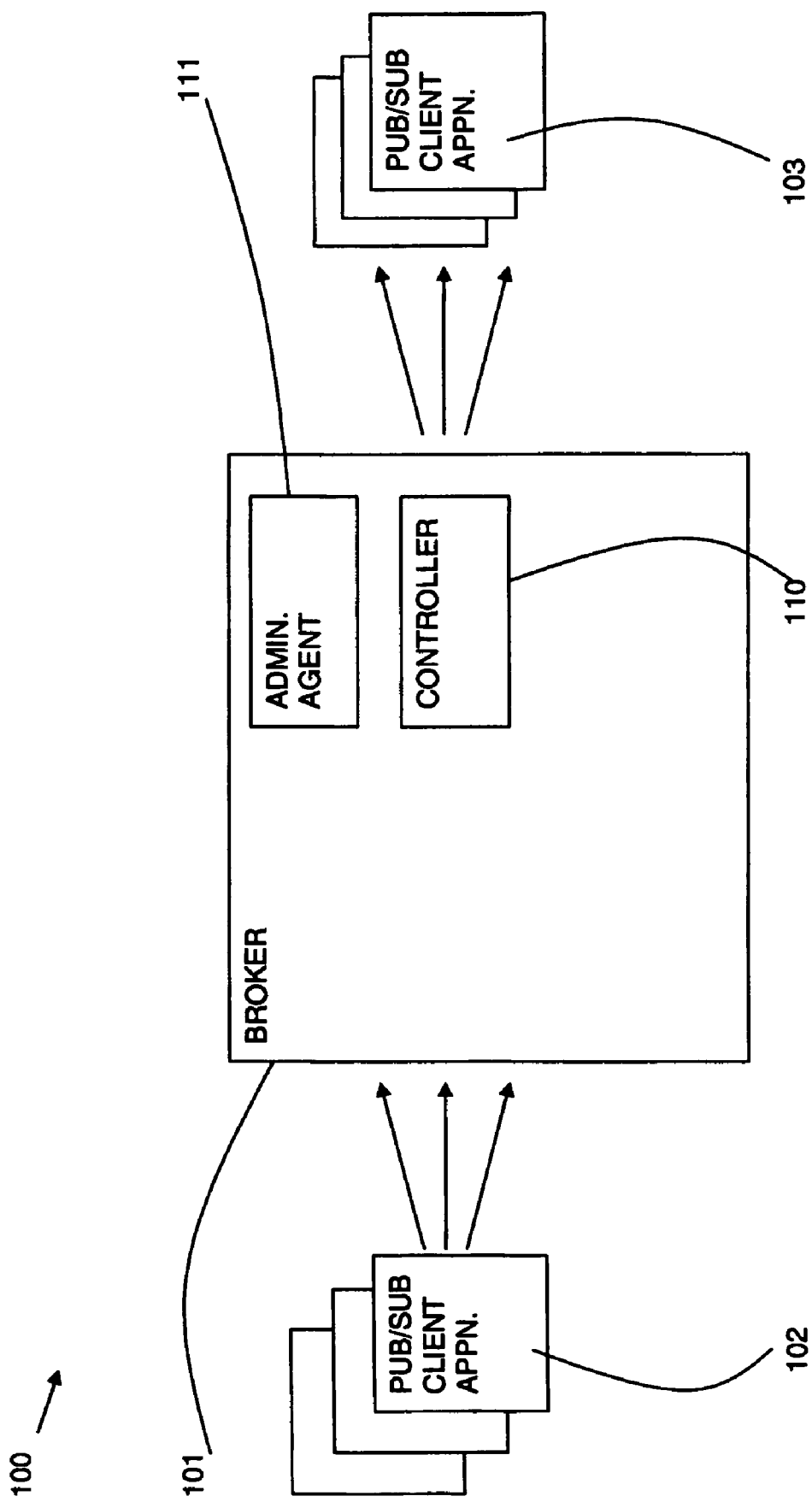
FIG. 1 is a diagram of a broker-based publish/subscribe system to which the described embodiment of the invention relates.

As will be appreciated by one of skill in the art, the present invention may be embodied as a method, system, or computer program product. Accordingly, the present invention may take the form of an entirely hardware embodiment or an embodiment combining software (including firmware, resident software, micro-code, etc.) and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A broker-based publish/subscribe messaging system is provided in which administration is carried out by a publish/subscribe client application via a session-based network connection to the broker. Referring to FIG. 1, a broker-based publish/subscribe system 100 is shown. The system 100 includes a broker 101 which processes messages between client applications 102 which publish messages and client applications 103 which subscribe to messages. A client application may both publish messages and subscribe to messages and the term publish/subscribe client application is used to refer to a client application which may publish or subscribe or both. The message broker 101 in a publish/subscribe system 100 handles the processing, transformation and distribution of messages passing between client applications 102, 103. Messaging middleware is provided on each of the client applications 102, 103 as well as in the message broker 101 to provide the messaging logic.

Messages include a header with an identifying topic. A subscribing client application 103 can register a subscription with a broker 101 based on a topic and/or content of interest to the client. Subscribing client applications 103 can use a mixture of topic and content criteria to select which messages they receive.

A message broker 101 may be one of a plurality of message brokers which communicate with each other as a broker network and in which client applications 102, 103 interact with any one of the connected brokers. Brokers can propagate subscription registrations through the network of connected brokers, and publications can be forwarded to all brokers that have matching subscriptions.

A publisher client application 102 can publish a message by sending it to the message broker 101 and the publisher client application 102 need not be concerned with where the published messages are subsequently going. Subscriber client applications 103 communicate with the message broker 101 to subscribe to messages and the subscriber applications 103 need not be concerned where the messages they receive have originated. The message broker 101 assures the validity of the message source, and manages the distribution of the messages according to the valid subscriptions registered in the message broker 101. An example of a broker-based system for delivery of messages is IBM® WebSphere® Business Integration Message Broker provided by International Business Machines Corporation (IBM and WebSphere are trademarks of International Business Machines Corporation in the United States, other countries or both).

A broker 101 includes a controller 110 and an administrative agent 111 for handling administration of the broker 101 based on received commands. Client applications 102, 103 send and receive messages to and from a broker 101 using queues or other supported methods of communication. The broker 101 carries out processing on messages flowing through the broker domain. For example, the broker 101 may carry out the following processes: route a message to several destinations using contents rules, transform a message to different formats, store and retrieve messages in a database, modify the contents of a message, publish a message, etc.

An input node represents a messaging queue or other supported communication means. A broker 101 sends one or more messages to one or more recipients from output nodes that represent output messaging queues, or other supported communication means, or publication nodes that redistribute messages to interested subscribers.

There are broker-based publish/subscribe messaging protocols which do not use queues. These protocols have a direct socket connection from the publish/subscribe client application to the broker. Instead of using queues, messages are sent to and received from port numbers. Port number input and output nodes are defined in the broker.

An example of such a direct socket protocol is IBM's WebSphere MQ Telemetry Transport protocol used to communicate with IBM's WebSphere Business Integrator Message Broker product. The MQ Telemetry Transport protocol is a protocol for publish/subscribe over TCP/IP (Transmission Control Protocol/Internet Protocol). The protocol was previously referred to as MQ SCADA device protocol (MQIsdp) (where SCADA stands for Supervisory, Control, and Data Acquisition).

The MQ Telemetry Transport protocol is a specialized protocol for communication from remote devices into a message broker to support the delivery of data from embedded field equipment to a message broker over TCP/IP. Typical client devices are sensors that measure status, flow rate, temperature, level, kilowatts, etc.

The broker directly controls the TCP/IP socket connection to each publish/subscribe client, and so is able to send a message directly to one particular client. The message is sent to only one particular client on a socket connection regardless of how many other client applications are subscribed to a particular topic and would therefore normally expect to receive the message.

Figure 2:
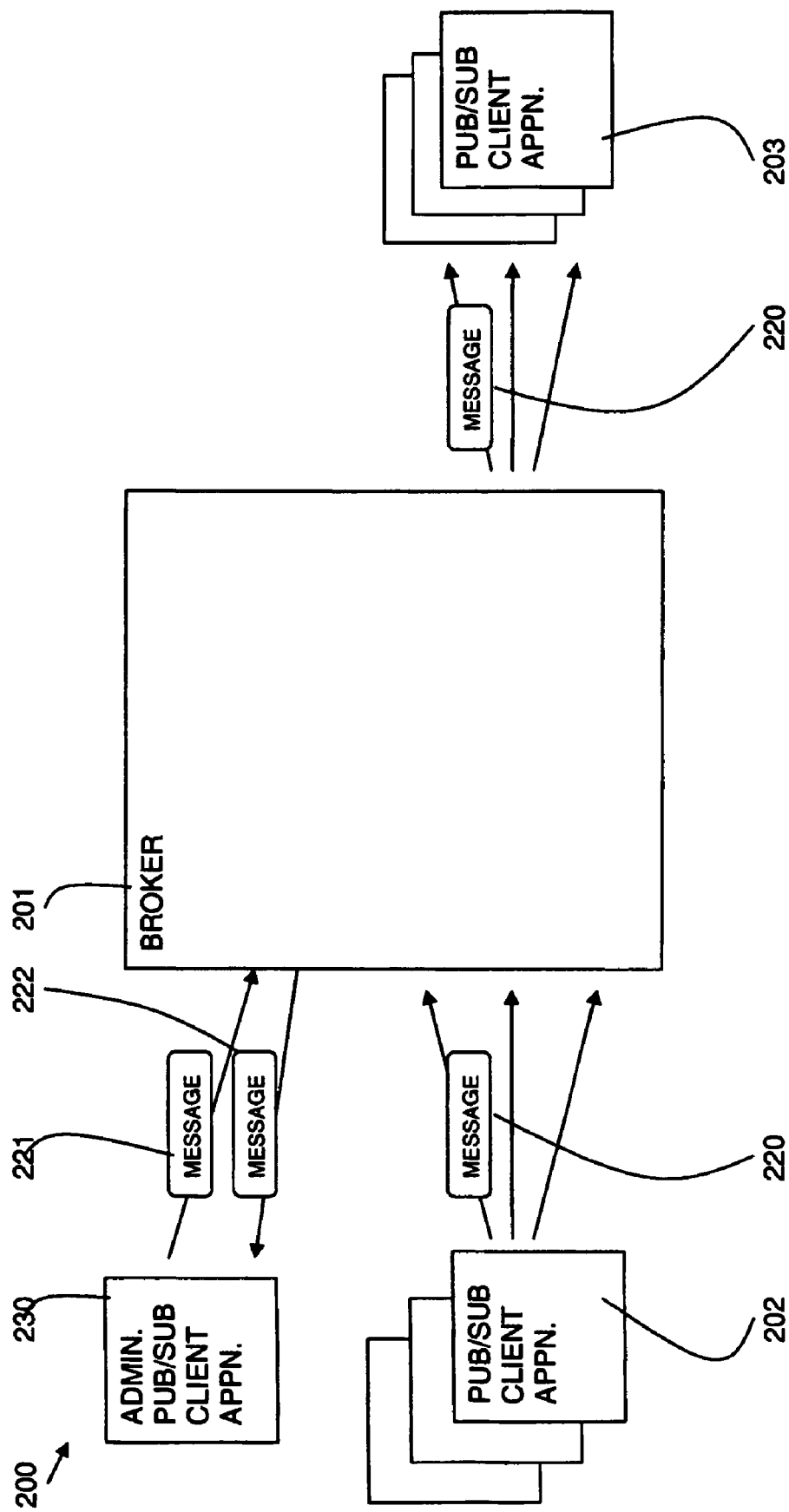
FIG. 2 is a diagram of a broker-based publish/subscribe system in accordance with the present invention.

The present invention applies the use of a session-based network connection protocol by a publish/subscribe client application which acts as the broker administrator. Referring to FIG. 2, a broker-based system 200 is shown. Publishing client applications 202 send messages 220 to the broker 201 and subscribing client applications 203 receive messages 220 from the broker 201.

A publish/subscribe client application 230 which is connected to the broker 201 using a session-based network connection such as a direct socket connection protocol (for example over TCP/IP) acts as an administrator. The other publish/subscribe client applications 202, 203 can also use session-based network connections (e.g. TCP/IP) for connection to the broker 201. The publish/subscribe client applications 202, 203 could alternatively, or in addition, use queue based communication of messages which are supported by an input queue and an output queue in the broker 201.

The administrator publish/subscribe client application 230 has a dedicated session-based network connection when it connects to the broker 201 which is used by the broker 201 for communication with the publish/subscribe client application 230. The administrator publish/subscribe client application 230 publishes administrative messages 221 to the broker 201 and may subscribe to messages 222 from the broker 201. The administrator publish/subscribe client application 230 can also publish and subscribe on topics other than the administration.

In this way, a plurality of publish/subscribe client applications 202, 203, 230 can all be using the same session-based network protocol (for example, MQ Telemetry Transport) into the same port of the broker 201 whilst administration is taking place by one of the publish/subscribe client applications 230 without the other clients accidentally or deliberately snooping the administration traffic, even through it is apparently flowing over the same publish/subscribe messaging domain.

The broker 201 forces a restriction of the wider publish/subscribe model to a single specified socket connection during administration. From the administrator publish/subscribe client application's point of view, it is a normal publish/subscribe client application; however, it is more robust from a security aspect as no other client applications can see the administration messages to the administrator publish/subscribe client application 230.

In an exemplary embodiment, administrative messages between the administrator client application 230 and the broker 201 are conducted using a pair of topics. The use of a pair of topics makes it appear that real publish/subscribe messaging is taking place, thus allowing standard publish/subscribe client software to be used.

Once an administrative session has been established between an administrator client application 230 and the broker 201, regardless of whether or not any other clients 203 are subscribed to the topics used for sending and receiving administrative messages, the broker 201 only pays attention to messages transmitted on the particular socket 213 from the client application 230 that it knows to be the administrator, and only sends responses back down the socket 213 to that client application 230.

The administrator client application 230 appears to be engaging in ordinary publish/subscribe communication, by which it sends and receives administrative messages 221, 222, but the broker 201 ensures that it is only possible for that one client application 230 to see any of the administrative messages 221, 222 going in or out of the broker 201.

The administrator publish/subscribe client application 230 may subscribe to the response topic from the broker 201 for administrative sessions. The data will come to the administrator publish/subscribe client application 230 anyway via the dedicated socket, so it does not have to subscribe. However, for the administrator publish/subscribe client application 230 to act in a standard publish/subscribe manner, a subscription may be submitted to the broker 201. In this way, the administrator publish/subscribe client application 230 will not be surprised by unexpected messages arriving on topics to which it had not explicitly subscribed.

The broker 201 sees administration commands on the session topic which is randomly generated for the administration session when the administrator publish/subscribe client application 230 first connects for a session. If the administrator publish/subscribe client application 230 is disconnected then reconnected, it can use the same session topic to continue administration, even though it is using a different socket connection to the initial one on which the session was established. Alternatively, the broker may not allow this, as an extra level of security.

An example of a sequence of messages between an administrator client application and the broker is described below.

1. Administrator subscribes to $SYS/sys topic. (This is to maintain the appearance of publish/subscribe processing at the subscribing client application. This may not be necessary, depending on the client software.)

2. Administrator publishes a message to a pre-defined system topic, indicating the intent to start an administration session:
   client to broker
   topic: $SYS/sys
   message: open channel 3. Broker sends a message directly to the client application which issued the "open channel" request with a message which looks like a delivered publication:
   broker to client
   topic: $SYS/sys
   message: use topic: $SYS/abc "abc" is a randomly-generated session topic name. Any other client application subscribed to $SYS/sys at this point does not see this message. Only the connected client which issued the "open channel" request receives it.

4. Administrator uses the allocated session topic to publish administration commands:
   client to broker
   topic: $SYS/abc
   message: list properties The broker ensures that even if someone else gets to know the allocated session topic "abc" (which would require reading over the administrator's shoulder), only messages sent from the connected client application which initiated the administration session are accepted by the broker as commands. Anyone else subscribing to that session topic will not see the command messages sent on that topic.

5. Broker sends responses to commands in a message which looks like a delivered publication:
   broker to client
   topic: $SYS/abc
   message: properties are x, y, z Only the connected client application which initiated the administration session sees these messages, regardless of who else is subscribed to $SYS/abc.

6. To end the administration session, the administrator can either send a "log-off" command message, or can disconnect from the broker. Both of these actions will terminate the administration session. The process is repeated from step 1 to establish a subsequent administration session.

Figure 3:
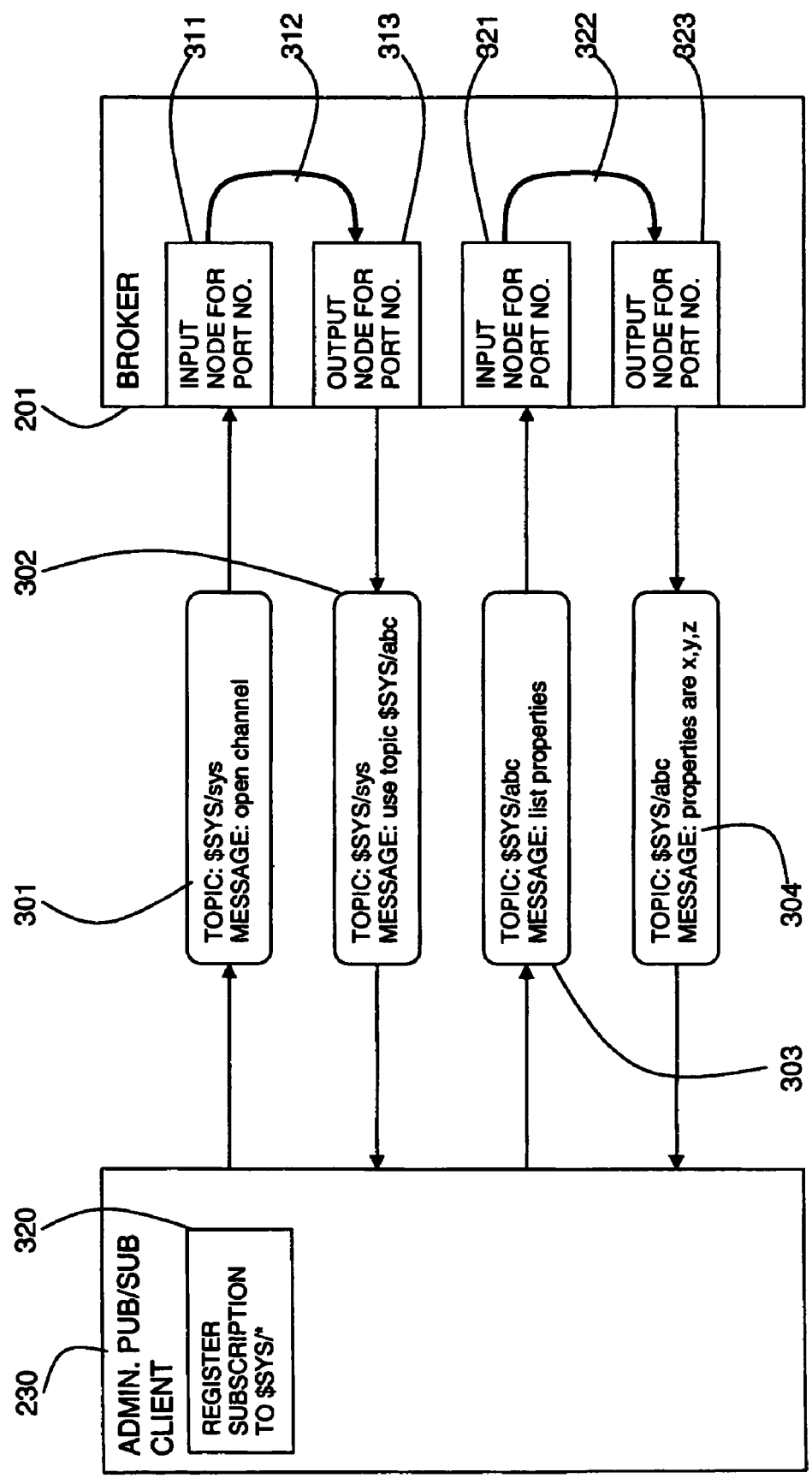
FIG. 3 is a schematic diagram of an administration message session in accordance with the present invention.

FIG. 3 shows the message communication in an administration session as described above between an administrator client application 230 and a message broker 201.

A first message 301 is sent by the administrator to the broker. This message 301 arrives at an input node 311 of a message flow 312 in the message flow engine of the broker 201. The message flow 312 processes the message 301 by recognizing the administration command of "open channel" in the message 301 and generating a random topic for the administrator to use. The output node 313 for the published response message 302 from the message flow 312 identifying the topic name is only the output node 313 for the same port number as the incoming message 301.

The administrator 230 receives messages with topics $SYS/*320 on the direct socket connection and therefore receives the response message 302 specifying the new topic name to use for the administration session. The administrator 230 sends a message 303 with the new topic name, including an administration command, for example, to list properties. Again, the message 303 is received as an input node 321 of a message flow 322 in the message flow engine of the broker. The message flow 322 processes the message 303 by collecting the requested information. The output node 323 for the published response message 304 from the message flow 322 sending the requested information is only the output node 323 for the same port number as the incoming message 303.

In this way, an administration session can be carried out using messaging software from a client application using publish/subscribe commands. The direct connection of the client application enables the administration session to be kept secure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for administration of a broker-based publish/subscribe messaging system, comprising:
   with a processor executing a broker, establishing a session-based network connection with a processor executing a publish/subscribe client application;
   with said processor executing said broker, receiving administration commands as messages from the processor executing said publish/subscribe client application via the session-based network connection; and
   with said processor executing said broker, sending response messages via the session-based network connection to only the processor executing said administering publish/subscribe client application; wherein a first said response message from the broker specifies a randomly generated session topic name, and wherein the broker only accepts as administration commands messages sent with the randomly generated session topic name.

2. A method as claimed in claim 1, wherein receiving administration commands as messages from the processor executing said publish/subscribe client application to the broker via the session-based network connection comprises using a message topic to publish the command messages to the broker.

3. A method as claimed in claim 2, wherein the message topic is a predefined topic for administrative sessions.

4. A method as claimed in claim 1, wherein the publish/subscribe client application subscribes to a topic for receiving the response messages from the broker.

5. A method as claimed in claim 1, wherein the session-based network connection is a direct socket connection using a TCP/IP protocol.

6. A system for administration of a broker-based publish/subscribe messaging system, comprising:
   a computer-implemented message broker configured to provide message handling for publish/subscribe client applications; said computer-implemented message broker being communicatively coupled to an administrator computer-implemented publish/subscribe client application via a session-based network connection;
   wherein said computer-implemented message broker is configured to receive administration commands as messages from the administrator publish/subscribe client application to the broker via the session-based network connection and send response messages via the session-based network connection to only the administrator publish/subscribe client application; wherein a first said response message from the broker specifies a randomly generated session topic name, and wherein the broker only accepts as administration commands messages sent with the randomly generated session topic name.

7. A system as claimed in claim 6, wherein the administrator publish/subscribe client application configured to send administration commands uses a message topic to publish the command messages to the broker.

8. A system as claimed in claim 7, wherein the message topic is a predefined topic for administrative sessions.

9. A system as claimed in claim 6, wherein the administrator publish/subscribe client application is configured to subscribe to a topic for receiving the response messages from the broker.

10. A system as claimed in claim 6, wherein the session-based network connection is a direct socket connection using a TCP/IP protocol.

11. A computer program product for administration of a broker-based publish/subscribe messaging system, said computer program product comprising:
   a computer readable storage medium having computer useable program code embodied therewith, the computer useable program code comprising
   computer usable program code configured to establish a session-based network connection from a publish/subscribe client application to a broker;
   computer usable program code configured to receive administration commands as messages from the publish/subscribe client application to the broker via the session-based network connection; and
   computer usable program code configured to send response messages from the broker via the session-based network connection to only the publish/subscribe client application; wherein a first said response message from the broker specifies a randomly generated session topic name, and wherein the broker only accepts as administration commands messages sent with the randomly generated session topic name.

12. A computer program product as claimed in claim 11, wherein the computer usable program code configured to receive administration commands as messages from the client application to the broker via the session-based network connection comprises computer usable program code configured to receive administration commands as messages from the publish/subscribe client application to the broker via the session-based network connection comprises using a message topic to publish the command messages to the broker.

13. A computer program product as claimed in claim 12, wherein the message topic is a predefined topic for administrative sessions.

14. A computer program product as claimed in claim 11, wherein the publish/subscribe client application subscribes to a topic for receiving the response messages from the broker.

* * * * *